United States Patent [19]

Callahan

[11] Patent Number: 4,472,091
[45] Date of Patent: Sep. 18, 1984

[54] DRY POWDER METERING APPARATUS

[75] Inventor: John W. Callahan, Peapack, N.J.

[73] Assignee: Pennwalt Corporation, Philadelphia, Pa.

[21] Appl. No.: 488,244

[22] Filed: Apr. 25, 1983

[51] Int. Cl.³ .............................................. B65G 53/40
[52] U.S. Cl. ...................................... 406/132; 251/129; 406/134; 222/196; 222/246; 222/563
[58] Field of Search .................. 406/132, 134, 146; 222/196, 199, 246, 563; 51/436, 438; 251/129

[56] References Cited

U.S. PATENT DOCUMENTS

| 845,919 | 3/1907 | Arcouet | 406/132 X |
| 2,734,782 | 2/1956 | Galle | 406/132 |
| 3,029,743 | 4/1962 | Johns | 251/129 X |
| 3,449,016 | 6/1969 | Knowles | 406/132 |
| 4,340,083 | 7/1982 | Cummins | 251/129 X |

*Primary Examiner*—Jeffrey V. Nase

[57] ABSTRACT

Apparatus which controllably meters dry powder from a powder supply chamber falling through a vertically disposed axial passageway interconnecting the supply chamber with a mixing chamber therebelow for forming an air-powder mixture therein for transport to a desired site. A tapered plug member is bonded to a bimorph bender comprising a piezoelectric element bonded to each face of a thin, flat, cantilevered metallic beam which is deflectable by a dc bias or driving voltage applied to the bender to cause the tapered plug to penetrate or move within the passageway, thus varying width of annular gap formed between the plug and passageway, and hence, amount of powder capable of falling therethrough. An oscillating voltage may be impressed upon the piezoelectric elements to cause the deflected beam to additionally be vibratorily displaced in accordance with the frequency of vibrations of the impressed oscillating source.

13 Claims, 5 Drawing Figures

DRY POWDER METERING APPARATUS

STATEMENT OF THE INVENTION

This invention relates to apparatus for the controlled metering of dry powder and more particularly to such apparatus wherein the powder flow rate is controlled by a throttle valve assembly responsive to voltage controlled piezoelectric means.

BACKGROUND AND SUMMARY OF THE INVENTION

Abrasive jet machining may be defined as the removal of material through the action of a focused, high velocity stream of fine grit or powder-loaded gas. Basic apparatus for carrying out the abrasive jet machining process may include an air or gas supply, a powder reservoir with cooperating vibrating means, a mixing chamber, and a conduit for feeding the resultant powder-gas mixture to a hand held piece having an appropriate nozzle for directing the powder-gas mixture against a workpiece for delicate removal of portions thereof. A foot switch may control the gas pressure at the nozzle. Under pulsation from the vibrating means, the powder trickles into a pressurized air stream, the amount of powder delivered being proportional to the amplitude of vibration, among other factors.

The abrasive powder, such as aluminum oxide and silicon carbide, for example, should be well classified and clean, and typically ranges in size from about 10 to 150 microns in diameter.

Abrasive jet machining is not a mass material removal process, but one of finishing. Because of the small amount of abrasive powder flowing through the nozzle at any given instant, it is not difficult to remove selected portions of the workpiece. Constant motion of the hand held piece and nozzle is recommended to lessen the risk of forming unwanted grooves or imperfections on the workpiece surfaces.

Current vibrators however have a tendency to produce unreliable powder flow rates resulting in an excess or deficiency of abrasive powder particles in the powder-gas mixture, and hence, a quality of finish on the workpiece which may not be satisfactory, whether the finishing is accomplished manually or by electronic control.

The present invention provides apparatus which supplies dry powder in controllable amounts from a powder supply chamber to a mixing chamber where the resultant air-powder mixture is fed into a line for transport to a site requiring the mixture. The apparatus may be advantageously employed in any application where it is desired or required that dry powder be supplied, conveyed, metered or transported in controllable amounts, for example, in abrasive jet machining processes aforedescribed, in dry powder coatings for electrostatic painting processes, and the like.

The present invention provides apparatus which meters dry powder from a pressurized powder supply chamber by means of a throttling device responsive to voltage. More specifically, the application of a direct current voltage to a pair of piezoelectric elements bonded to opposing faces of a thin cantilevered metallic beam, as in a bimorph bender, causes the beam to deflect upwardly or downwardly depending upon the polarity of the applied dc voltage to the polarized piezoelectric elements. A tapered plug is bonded to the free end of either the beam or upper piezoelectric element such that deflection of the beam causes the plug to traverse a passageway connecting the powder supply chamber with the mixing chamber to thereby vary the size of the passageway opening and hence the amount of powder capable of falling or flowing therethrough.

The plug is provided with a thin upstanding rod which penetrates the passageway to contact the powder in the powder supply chamber. Since the dry powder may not fall freely of its own accord through the controlled opening of the passageway, the dc bias voltage which controls the amount of deflection of the beam is impressed with an ac component, typically 60 $H_z$, from a fixed frequency control oscillator, for example, which causes the deflected beam to vibrate, which, in turn, vibrates the plug and rod to help insure the free flow of the powder.

DETAILED DESCRIPTION OF THE INVENTION

Figure 1:
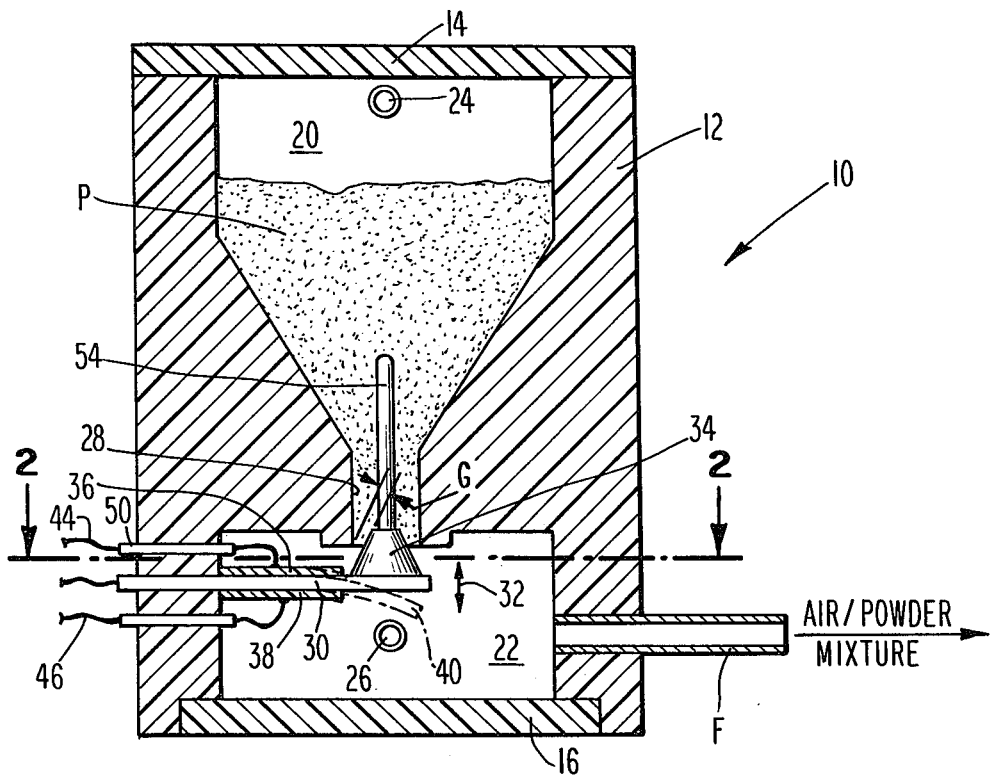
FIG. 1 is a longitudinal partially sectioned, partially diagrammatic view of the apparatus of the present invention.
Figure 2:
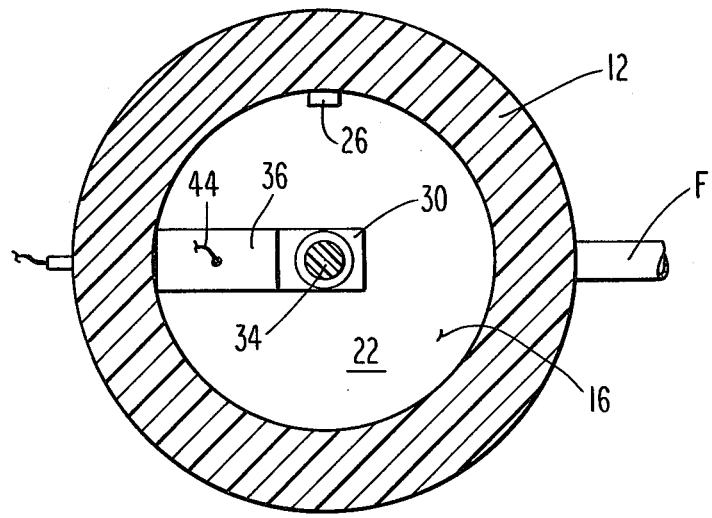
FIG. 2 is a sectional view of the apparatus of FIG. 1 taken along line 2—2 thereof.

Referring to FIGS. 1 and 2, the dry powder metering apparatus 10 includes a cylindrical body member 12 having end covers 14 and 16 removably affixed to respective ends thereof in pressure-tight relationship by any suitable known means. The apparatus is conveniently and preferably made from an abrasion-resistant plastic material, although aluminum, for example may be used if various components, later described, are suitably electrically insulated therefrom.

The apparatus includes a powder supply chamber 20 disposed above a powder-gas or powder-air mixing chamber 22. Gas or air is supplied to supply chamber 20 and mixing chamber 22 through conduits 24 and 26 respectively, each of the conduits 24 and 26 being supplied from a common source by means of a T-joint (not shown), for example, or separate air lines for each may be employed if flexibility of pressures in the chambers is desired.

Supply chamber 20 is funnel-shaped as illustrated and terminates at its lower portion in an elongated cylindrical passageway 28, axially disposed, communicating with mixing chamber 22.

A thin, flat metallic beam 30, suitably stainless steel or brass, is cantilevered to a wall portion of body 12 defining the mixing chamber 22 and extends radially inwardly below passageway 28 and slightly therebeyond. Beam 30 is thus deflectable in the directions indicated by arrow 32.

Figure 3:
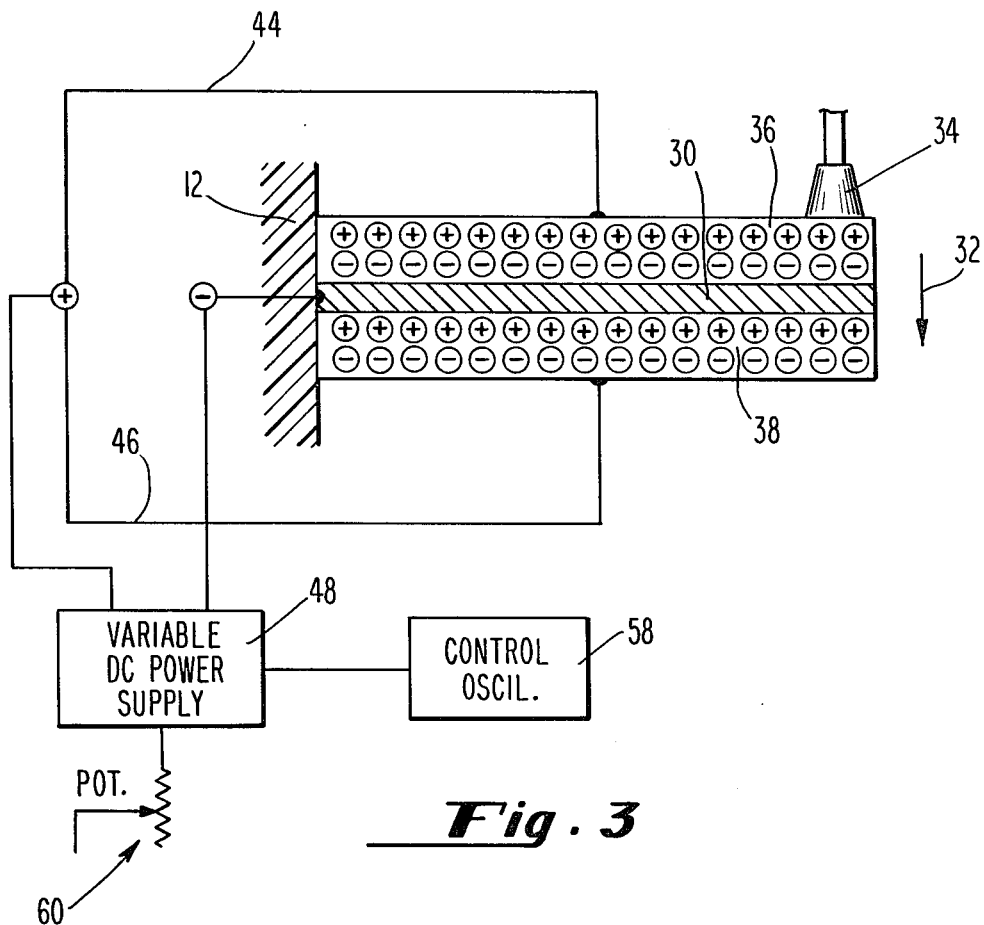
FIG. 3 is a partially sectional view illustrating diagrammatically a modification of the apparatus with the means for applying variable dc voltages thereto shown schematically.

Bonded to beam 30 at its outer end portion is a tapered plug 34 in axial alignment with passageway 28. Piezoelectric elements 36 and 38 are bonded to the upper and lower faces respectively of beam 30 by a suitable electrically conductive epoxy cement. If piezoelectric elements 36 and 38 are polarized as shown in FIG. 3 and a dc voltage of positive polarity is applied to the outer surfaces of the piezoelectric elements 36 and 38, and a dc voltage of negative polarity applied to beam 30, then beam 30 will be deflected downwardly as shown exaggeratedly by phantom lines 40 in FIG. 1. Conversely, by reversing the polarity of the dc voltage, beam 30 will be deflected upwardly. Upward deflection of beam 30 decreases the size of annular gap G, formed between plug 34 and passageway 28, to thereby lessen the flow capability of powder therethrough to mixing chamber 22. An increase of voltage increases the degree of deflection of the beam.

Figure 5:
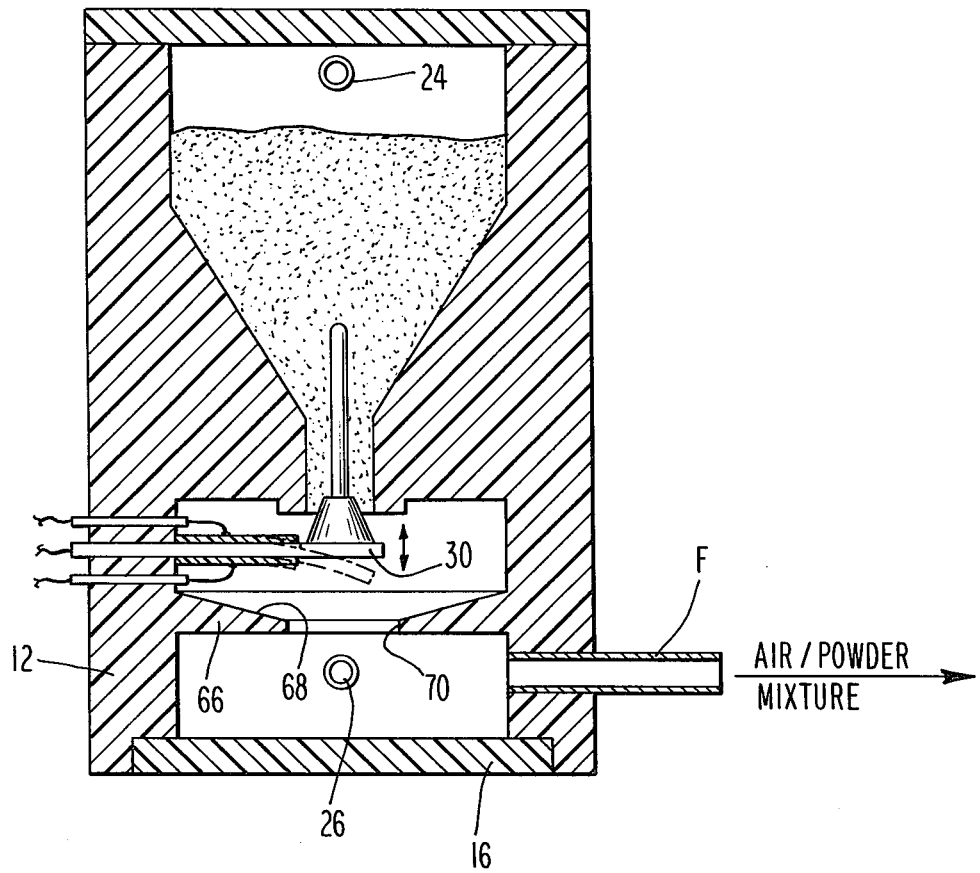
FIG. 5 is a view similar to FIG. 1, illustrating a modification of the apparatus shown therein.

Plug 34 may be bonded to an upper outer surface of piezoelectric element 36 as illustrated in FIG. 3, in lieu of being bonded to beam 30 as shown in FIGS. 1 and 5.

Piezoelectric elements 36 and 38 are conveniently ceramic materials such, for example, as barium titanate, lead zirconate titanate, and the like.

A positive direct current voltage is supplied to piezoelectric elements 36 and 38 through conductors 44 and 46 respectively from a variable dc power supply 48 (FIG. 3). Insulating tubes 50 (FIG. 1) conveniently carry the conductors through a wall of body 12. Beam 30 and piezoelectric elements 36 and 38 are suitably insulated from body member 12, if metallic.

A rod 54, suitably abrasion-resistant plastic material, is axially affixed to an upper portion of plug 34. Rod 54 extends through passageway 28 to penetrate powder P in supply chamber 20. Since dry powder P may not fall freely through gap G of its own accord as aforementioned, an oscillating fixed frequency voltage component is impressed upon piezoelectric elements 36 and 38 by a control oscillator to cause the deflected beam 30 to vibrate in accordance with the frequency of the oscillations, typically 60 Hz. Vibration of beam 30 causes plug 34 and rod 54 to vibrate therewith to help insure free flow of powder P through gap G into mixing chamber 22. The resultant air-powder mixture in mixing chamber 22 may then be conveyed or transported to the desired site through a convenient feed line F.

In a typical example, beam 30 is brass, 2" long × ½" wide × 0.002" thick. Piezoelectric elements 36 and 38 are each made of a ceramic material, lead zirconate titanate, for example, having the same length and width as beam 30, but of 0.004" thickness, thus providing a total beam-piezoelectric element thickness of 0.010".

Piezoelectric elements 36 and 38 are similarly polarized. Piezoelectric element 36 is bonded to beam 30 such that its upper or outer surface is positively charged (FIG. 3) while the lower or outer surface of piezoelectric element 38 is negatively charged. The beam and piezoelectric elements function as a bimorph bender to deflect either upwardly or downwardly depending upon the polarity of the voltage connections to the piezoelectric elements and to the beam.

Well known means are available for varying the dc output of power supply 48 and may conveniently be accomplished through a potentiometer 60, for example.

Calculation of the driving voltage needed to displace beam 30 a desired distance may be obtained from the following formula:

$$V = \frac{X}{4d \left(\frac{1}{t}\right)^2}$$

where
V = driving or bias voltage, volts
X = peak displacement, meters
l = length of beam and elements, inches
t = thickness of beam and elements, inches
and where
d = 200 × 10$^{-12}$ meters (piezoelectric coefficient in bending of lead zirconate titanate).

Thus, if a peak displacement X of approximately 0.04" (0.001 meters) is desired (a total displacement of 0.08"), then $$V = \frac{1 \times 10^{-3}}{8 \times 10^{-10}(4 \times 10^4} \text{ or } 31.25 \text{ volts}$$

The poling voltage for lead zirconate titanate is approximately 50 volts/mil thickness. In order to avoid de-poling the lead zirconate titanate piezoelectric elements, driving or bias voltages should be restricted to no more than about 20% of the poling voltage, or about 10 volts/mil. Since each of the piezoelectric elements 36 and 38 is 0.004" thick or 4 mils in thickness, the driving voltage/mil thickness may be found by dividing 31.25 by 4, or about 7.8 volts/mil, which value is well below the de-poling voltage of about 10 volts/mil.

Thus, plug 34 is displaced a total of about 0.08" when a dc bias or driving voltage of ±31.25 volts is applied to the piezoelectric elements, which degree of displacement is more than adequate to permit gap G to vary widely as plug 34 penetrates, or moves within passageway 28.

Since the total beam displacement of 0.08" requires only about 7.8 volts/mil thickness, an additional 2.2 volts/mil may be applied (7.8 subtracted from the de-poling voltage of 10) or, say 2 volts/mil safely without fear of de-poling the piezoelectric elements.

Thus, by additionally applying a controlled oscillating voltage of fixed frequency of 60 Hz, for example, to the piezoelectric elements 36 and 38 by means of control oscillator 58 as shown in FIG. 3, a constant vibration of 60 Hz per second of the deflected beam results, the beam having a vibratory amplitude at its free end of approximately 0.005", which value may be obtained by solving for x in the following equation:

$$\frac{31.25}{03} = \frac{2}{x}$$

Stated differently, the deflected beam experiences a vibratory displacement of about ±0.0025".

If the total constant displacement or deflection is reduced from 0.08" to 0.06", for example, the vibratory displacement voltage may be proportionately increased to provide a greater beam vibratory displacement of about ±0.01".

Approximate beam deflection amplitudes of 0.08" and 0.06" with concomitant beam vibratory displacements respectively of ±0.0025" and ±0.01" are very practical values for controllably metering dry powder through controlled gap opening sizes of the powder metering apparatus of the present invention.

Figure 4:
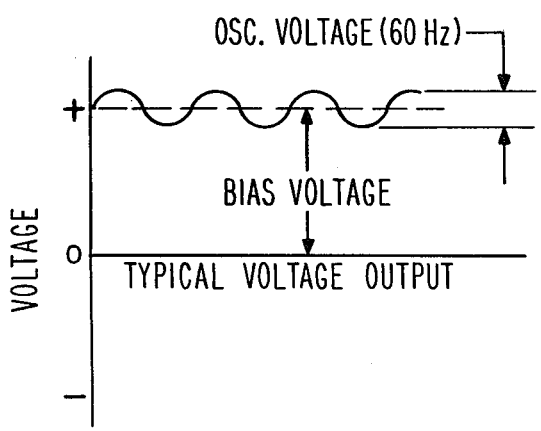
FIG. 4 graphically illustrates typical bias voltage and oscillating voltage outputs.

FIG. 4 graphically illustrates a 60 Hz oscillating voltage impressed upon a bias voltage. If the bias voltage is about +30 volts, for example, the oscillating voltage may have a peak to peak voltage of about 8 volts.

Referring now to FIG. 5, an annular baffle 66 may optionally be interposed between conduit 26 and beam 30 to assist in reducing wear on the piezoelectric elements caused by the turbulent flow of powder particles, often abrasive, impinging against the elements. The piezoelectric elements may be coated with a soft, flexible elastomeric material such as polyurethane to inhibit wear after electrical connections to the piezoelectric elements have been made. The coating should be sufficiently thin so as not to adversely affect the deflectional and vibrational characteristics of the piezoelectric elements.

Baffle 66 is provided with an inwardly sloping face 68 and a central passageway 70.

It is understood that the invention is not intended to be limited to the exact details of construction, sizes, dimensions, materials, deflections and displacement shown or described, for obvious modifications may occur to a person skilled in the art.

I claim:

1. Dry powder metering apparatus comprising
   a cylindrical body member having a powder supply chamber and an air-powder mixing chamber at its upper and lower portions respectively,
   a vertically axially disposed passageway interconnecting said chambers,
   an electrically conductive horizontal beam cantilevered to said body member and extending radially inwardly beneath said passageway,
   throttling means movable with said beam and penetrable into said passageway for providing a controlled annular gap between said throttling means and said passageway,
   a piezoelectric element bonded to each of an upper and lower face of said beam to form a bimorph bender with means for completing a dc circuit therethrough for controllably deflecting said beam to change width of said annular gap as said throttling means is moved substantially vertically within said passageway, and
   wherein an oscillating voltage is impressed upon said bimorph bender to produce oscillations thereof, said oscillations having a fixed frequency to cause said deflected beam to be vibratorily displaced in accordance with the frequency of said oscillations, and
   additional means for pressurizing said chambers whereby powder flowing through said gap forms an air-powder mixture for transport thereof from said mixing chamber.

2. Apparatus of claim 1 wherein said throttling means is a plug member tapering upwardly.

3. Apparatus of claim 2 wherein base of said plug seals said passageway.

4. Apparatus of claim 2 wherein said beam is metallic, thin, and flat.

5. Apparatus of claim 1 wherein said piezoelectric elements comprise ceramic materials.

6. Apparatus of claim 1 wherein reversing polarity of said dc circuit through said bimorph bender causes said bimorph bender to deflect in opposite direction.

7. Apparatus of claim 6 wherein said bimorph bender is deflected upwardly.

8. Apparatus of claim 6 wherein said bimorph bender is deflected downwardly.

9. Apparatus of claim 1 wherein degree of said beam deflection and beam vibratory displacement are proportional to respective voltages applied thereto.

10. Apparatus of claim 9 wherein said plug member is provided with an upstanding rod penetrating said passageway and into powder contained within said supply chamber.

11. Dry powder metering apparatus comprising
    a body member having a supply chamber for said dry powder and an air-powder mixing chamber at its upper and lower portions respectively,
    an axially disposed passageway interconnecting said chambers,
    a metallic beam horizontally cantilevered to said body member and extending radially inwardly beneath said passageway,
    a piezoelectric element bonded with an electrically conductive material to each of an upper and lower face of said beam to form a bimorph bender,
    a plug member having an upward taper bonded to said bimorph bender and penetrable into said passageway for providing a controlled gap between said plug member and said passageway, said gap having a width decreasing as said plug member moves vertically upwardly into said passageway, said gap width controlling flow of powder from said powder supply chamber capable of passing through said passageway,
    voltage means connected to said bimorph bender for controllably deflecting said beam to control said gap width,
    said bimorph bender having an oscillating voltage additionally impressed thereupon to cause said deflected beam to oscillate in accordance with frequency of oscillations of said oscillating voltage.

12. Apparatus of claim 11 wherein said plug member is provided with an upstanding rod penetrating said passageway and into said dry powder in said supply chamber.

13. Apparatus of claim 12 wherein said body member is cylindrical and made of an abrasion-resistant plastic material, said beam is brass, and said piezoelectric elements are lead zirconate titanate.

* * * * *